(12) United States Patent
Horiguchi

(10) Patent No.: US 10,048,517 B2
(45) Date of Patent: Aug. 14, 2018

(54) BACKLIGHT DEVICE AND LIQUID CRYSTAL DISPLAY APPARATUS

(71) Applicant: SAKAI DISPLAY PRODUCTS CORPORATION, Sakai-shi, Osaka (JP)

(72) Inventor: Yuki Horiguchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/606,929

(22) Filed: May 26, 2017

(65) Prior Publication Data

US 2017/0261769 A1    Sep. 14, 2017

Related U.S. Application Data

(63) Continuation of application No. PCT/JP2014/081573, filed on Nov. 28, 2014.

(51) Int. Cl.
*G02F 1/00* (2006.01)
*G02B 5/126* (2006.01)
(Continued)

(52) U.S. Cl.
CPC .......... *G02F 1/0063* (2013.01); *F21V 7/0041* (2013.01); *G02B 5/126* (2013.01);
(Continued)

(58) Field of Classification Search
CPC .......... G02F 1/13338; G02F 1/133512; G02F 1/133308; G02F 1/133603;
(Continued)

(56) References Cited

U.S. PATENT DOCUMENTS

| 2010/0045888 A1 | 2/2010 | Naritomi |
| 2011/0205464 A1 | 8/2011 | Kim et al. |
| 2012/0281153 A1 | 11/2012 | Kuromizu |

FOREIGN PATENT DOCUMENTS

| JP | 9-280217 | 10/1997 |
| JP | 2007/188029 | 7/2007 |

(Continued)

OTHER PUBLICATIONS

Int'l. Search Report issued in Int'l. App. No. PCT/JP2014/081573, dated Nov. 28, 2014.

*Primary Examiner* — Alicia M Harrington
(74) *Attorney, Agent, or Firm* — Greer Burns & Crain Ltd.

(57) ABSTRACT

A backlight device including an optical sheet diffusing and outputting light from a light guide plate, a frame member having an opening corresponding to a light output surface of the light guide plate, the frame member being provided between the light guide plate and the optical sheet to secure a positional relationship therebetween. The device also includes a plurality of securing members provided at a peripheral edge of the frame member, which secure the optical sheet, are each coupled with the frame member via a thin hinge, and each include a pressing portion having a hole, where the pressing portion presses the optical sheet to the frame member. The frame member is provided with protrusions respectively fit into the holes. The optical sheet includes perforations, and the protrusions are inserted through the perforations and fit into the holes, and the pressing portions press the optical sheet to the frame member.

4 Claims, 6 Drawing Sheets

(51) Int. Cl.
*G02F 1/1362* (2006.01)
*G02F 1/1335* (2006.01)
*F21V 7/00* (2006.01)
*G02F 1/01* (2006.01)

(52) U.S. Cl.
CPC .. *G02F 1/133602* (2013.01); *G02F 1/133606* (2013.01); *G02F 1/136209* (2013.01); *G02F 2001/0113* (2013.01)

(58) Field of Classification Search
CPC ......... G02F 1/133608; G02F 1/133606; G02F 1/136227; G02F 1/1333; G02F 1/00; G02F 1/0063; G02F 1/136209; G02F 1/133602; G02F 2001/0113; G02B 6/0021; G02B 2027/015; G02B 5/126; F21V 7/0041
See application file for complete search history.

(56) References Cited

FOREIGN PATENT DOCUMENTS

| | | |
|---|---|---|
| JP | 2013/242358 | 12/2013 |
| WO | 2011/093119 | 8/2011 |

BACKLIGHT DEVICE AND LIQUID CRYSTAL DISPLAY APPARATUS

This is a continuation of International Application No. PCT/JP2014/081573, with an international filing date of Nov. 28, 2014, the contents of which are hereby incorporated by reference.

BACKGROUND

1. Technical Field

The present invention relates to a backlight device including a light guide plate allowing light which is emitted from a light source and incident on an end surface thereof to be output from a light output surface thereof, an optical sheet diffusing the light from the light output surface and outputting the diffused light, and a resin frame member having an opening corresponding to the light output surface of the light guide plate and securing the positional relationship between the light guide plate and the optical sheet; and also relates to a liquid crystal display apparatus including such a backlight device.

2. Description of the Related Art

A liquid crystal display apparatus needs to include a backlight device which emits light onto a rear surface of a liquid crystal panel for transmission through the liquid crystal panel, since the liquid crystal panel itself does not emit light. Backlight devices are roughly classified into direct type backlight devices and edge type backlight devices.

An edge type backlight device includes LEDs (Light Emitting Diodes) that are arranged in, for example, a line and act as a light source, a light guide plate allowing light which is emitted from the light source and incident on an end surface thereof to foe output from a light output surface thereof, and an optical sheet diffusing the light from the light guide plate and outputting the diffused light onto a rear surface of a liquid crystal panel.

The edge type backlight device also includes a plastic (resin) chassis (frame member) securing the positional relationship between the light guide plate and the optical sheet, and a metal backlight chassis accommodating the light source and the light guide plate.

Recently, the distance between a display surface and the light source has been shortened along with the decrease in the width of a frame of a liquid crystal display apparatus. Therefore, the light source needs to be covered with the plastic chassis so as not to be directly viewable from the display surface.

WO2011/093119 (hereinafter "Patent Document 1") discloses an illumination device including a light guide plate that is located such that an end surface thereof faces a light source and guides light incident on the end surface thereof toward a light output surface, an optical member covering the light output surface of the light guide plate, a positioning member determining, in a planar direction, the position of the optical member with respect to the light guide plate, and an accommodation member accommodating the light source, the light guide plate and the optical member. The positioning member includes a positioning hole formed in the optical member and a positioning pin that is provided on the light guide plate and is fit into the positioning hole.

The illumination device disclosed in Patent Document 1 determines the position of an optical sheet (optical member) by directly stacking the optical sheet on the light guide plate and presses a plastic chassis (pressing member) on the optical sheet so that the optical sheet is not disengaged from the light guide plate.

The light guide plate absorbs heat generated by the LEDs (light source) and moisture in the air to expand and contract and thus is changed in the size. In a state where the optical sheet is directly stacked on the light guide plate, there occurs a problem that the deformation of the light guide plate is transferred to the optical sheet and thus the optical sheet is sagged and wrinkled, as a result of which, the display quality of the liquid crystal display apparatus is significantly declined. There is another problem that the heat radiant from the LEDs is transferred to the optical sheet via the light guide plate and thus only an end of the optical sheet (in the vicinity of the LEDs) has a high temperature and is wrinkled.

In order to avoid such a situation, it is conceivable to provide a plastic chassis between the light guide plate and the optical sheet to form a space therebetween, so that the optical sheet is not directly stacked on the light guide plate. However, in this case, an arrangement that the light guide plate is processed (e.g., a pin is provided on the light guide plate) so that the light guide plate is used to determine the position of the optical sheet cannot be performed. Therefore, the optical sheet cannot be secured. This causes a problem that when an external force such as a vibration or an impact is applied to the liquid crystal display apparatus, the optical sheet is flapped and damages the liquid crystal panel, which may decline the display quality.

SUMMARY

The present invention, made in light of the above-described situation has an object of providing a backlight device that does not easily allow the deformation and the heat of a light guide plate to be transferred to an optical sheet and secures the optical sheet so that the optical sheet is not flapped.

The present invention also has an object of providing a liquid crystal display apparatus including a backlight device that does not easily allow the deformation and the heat of a light guide plate to be transferred to an optical sheet and secures the optical sheet so that the optical sheet is not flapped.

A backlight device according to an embodiment of the present invention includes a light guide plate allowing light which is emitted from a light source and incident on an end surface thereof to be output from a light output surface thereof; an optical sheet diffusing the light from the light output surface of the light guide plate and outputting diffused light; a frame member formed of a resin and having an opening corresponding to the light output surface of the light guide plate, the frame member being provided between the light guide plate and the optical sheet to secure a positional relationship therebetween and blocking light from the light source against an output surface of the optical sheet; and a plurality of securing members provided at, and integrally formed with, a peripheral edge of the frame member, the plurality of securing members securing the optical sheet. The plurality of securing members are each coupled with the frame member via a hinge formed to be thinner than the frame member. The plurality of securing members each include a pressing portion having a hole, the pressing portion pressing the optical sheet to the frame member. The frame member is provided with protrusions respectively fit into the holes. The optical sheet includes perforations respectively allowing the protrusions to be inserted therethrough. The protrusions are inserted through the perforations and fit into the holes, and the pressing portions press the optical sheet to the frame member.

In this backlight device, the light guide plate allows light which is emitted from the light source and incident on the end surface thereof to be output from the light output surface thereof. The optical sheet diffuses the light from the light output surface of the light guide plate and outputs diffused light. The frame member, formed of the resin and having the opening corresponding to the light output surface of the light guide plate, is provided between the light guide plate and the optical sheet to secure a positional relationship therebetween and blocks light from the light source against an output surface of the optical sheet. The plurality of securing members provided at, and integrally formed with, the peripheral edge of the frame member secure the optical sheet. The plurality of securing members are each coupled with the frame member via the hinge formed to be thinner than the frame member. The pressing portions, each having the hole, press the optical sheet to the frame member. The frame member is provided with the protrusions respectively fit into the holes formed in the pressing portions. The optical sheet includes the perforations respectively allowing the protrusions to be inserted therethrough. The protrusions are inserted through the perforations and fit into the holes, and the pressing portions press the optical sheet to the frame member.

A backlight device according to the present invention includes a light guide plate allowing light, incident on an end surface thereof from a light source, to be output from a light output surface thereof; an optical sheet diffusing the light from the light output surface of the light guide plate and outputting diffused light; a frame member formed of a resin and having an opening corresponding to the light output surface of the light guide plate, the frame member being provided between the light guide plate and the optical sheet to secure a positional relationship therebetween and blocking light from the light source against an output surface of the optical sheet; and a plurality of securing members provided at, and integrally formed with, a peripheral edge of the frame member, the plurality of securing members securing the optical sheet. The plurality of securing members are each coupled with the frame member via a hinge formed to be thinner than the frame member. The plurality of securing members each include a pressing portion provided with a protrusion, the pressing portion pressing the optical sheet to the frame member. The frame member includes holes into which the protrusions are respectively fit. The optical sheet includes perforations respectively allowing the protrusions to be inserted therethrough. The protrusions are inserted through the perforations and fit into the holes, and the pressing portions press the optical sheet to the frame member.

In this backlight device, the light, guide plate allows light which is emitted from a light source and incident on the end surface thereof to be output from the light output surface thereof. The optical sheet diffuses the light from the light output surface and outputs diffused light. The frame member, formed of the resin and having the opening corresponding to the light output surface of the light guide plate, is provided between the light guide plate and the optical sheet to secure a positional relationship therebetween and blocks light from the light source against the output surface of the optical sheet. The plurality of securing members provided at, and integrally formed with, the peripheral edge of the frame member secure the optical sheet. The plurality of securing members are each coupled with the frame member via the hinge formed to be thinner than the frame member. The pressing portions each provided with the protrusion press the optical sheet to the frame member. The frame member includes the holes into which the protrusions are respectively fit. The optical sheet includes the perforations respectively allowing the protrusions to be inserted therethrough. The protrusions are inserted through the perforations and fit into the holes, and the pressing portions press the optical sheet to the frame member.

A liquid crystal display apparatus according to an embodiment of the present invention includes the backlight device according to an embodiment of the present invention; and a liquid crystal panel including a rear surface to receive light emitted by the backlight device.

An embodiment of the present invention realizes a backlight device that does not easily allow the deformation and the heat of a light guide plate to be transferred to an optical sheet and secures the optical sheet so that the optical sheet is not flapped.

An embodiment of the present invention realizes a liquid crystal display apparatus including a backlight device that does not easily allow the deformation and the heat of a light guide plate to be transferred to an optical sheet and secures the optical sheet so that the optical sheet is not flapped.

DETAILED DESCRIPTION

Figure 1:
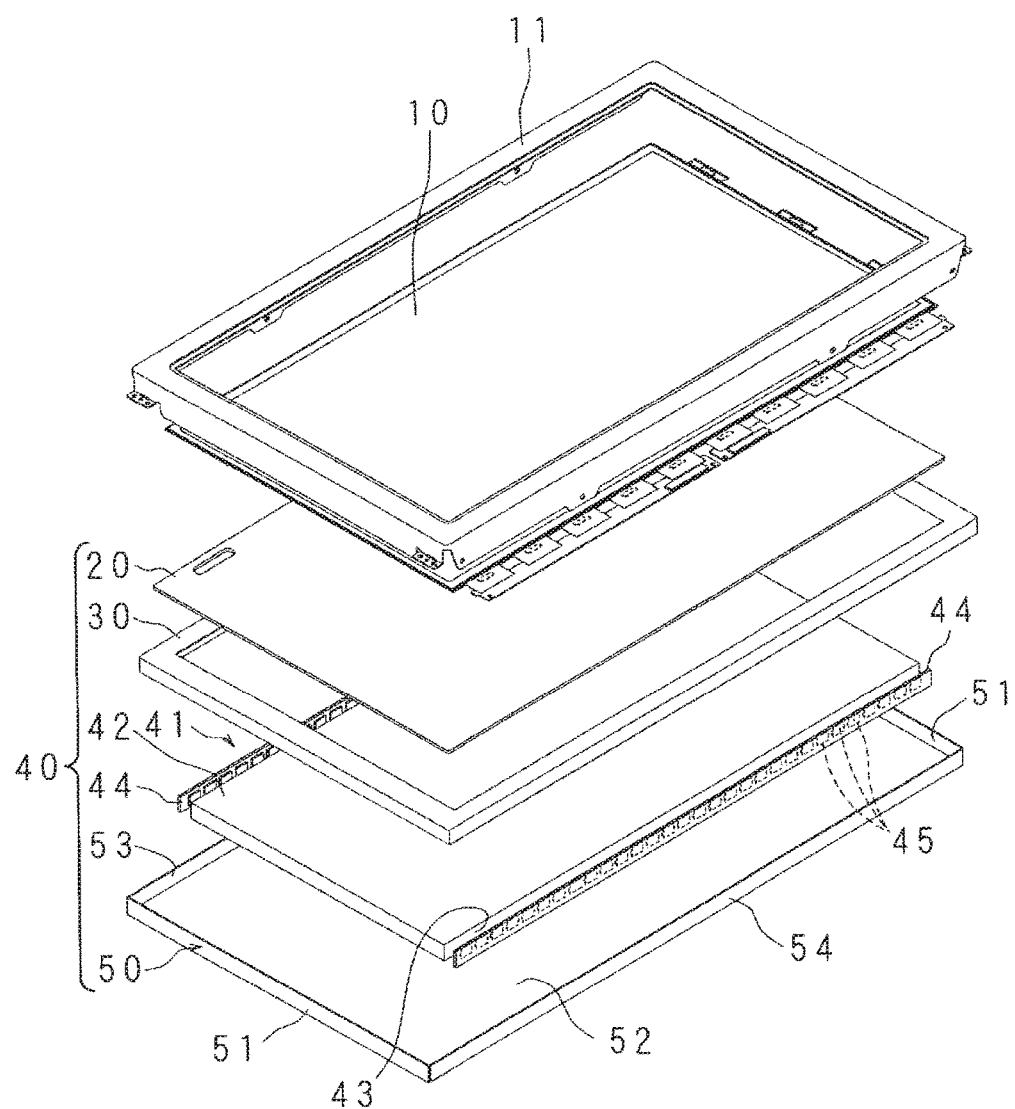
FIG. 1 an exploded isometric view showing a structure of a part of a backlight device and a liquid crystal display apparatus according to an embodiment of the present invention.

Hereinafter, embodiments of the present invention will be described, with reference to the drawings.
Embodiments FIG 1. is an exploded, isometric view showing a structure of a part of a backlight device and a liquid crystal display apparatus according to an embodiment of the present invention.

The liquid crystal display apparatus includes a rectangular liquid crystal panel 10 and a backlight device 40 which emits light onto a rear surface of the liquid crystal panel 10. A bezel 11 having a frame shape covers the liquid crystal panel 10 from a front surface thereof, and is engaged with a backlight chassis 50 accommodating the backlight device 40, so that the liquid crystal panel 10 and the backlight device 40 are held together.

In this embodiment, the liquid crystal display apparatus is usable for a TV receiver, a computer display or the like, and is used in a state where longer sides thereof are generally horizontal and shorter side thereof are generally vertical.

The liquid crystal panel 10 includes a pair of glass substrates (i.e., a front substrate and a rear substrate) distanced from each other by a predetermined gap and a liquid crystal material enclosed between the pair of glass substrates. On the rear substrate, switching elements such as, for example, TFTs (Thin Film Transistors) connected with source lines and gate lines crossing each other perpendicularly and pixel electrodes connected with the switching elements are provided in an array. An alignment film is also provided on the rear substrate. On the front substrate, color filters such as R (red) filters, G (green) filters, B (blue filters) or the like located in a predetermined array, a counter electrode, an alignment film and the like are provided. Outer to the substrates, polarizer plates are provided.

The backlight device 40 is accommodated in the backlight chassis 50 formed of a metal. The backlight chassis 50 has a shallow frame shape having a bottom surface. The backlight chassis 50 includes a rectangular bottom plate 52, a side plate 53 extending upward from a top longer side (in use) of the rectangular bottom plate 52, a side plate 54 extending upward from a bottom longer side (in use) of the rectangular bottom plate 52, and side plates 51 extending upward from both of two shorter sides.

The backlight chassis 50 accommodates a light guide plate 42, a plastic chassis (frame member) 30 and an optical sheet 20 stacked from the bottom plate 52. Sides of the light guide plate 42 are in contact with the side plates 51, 53 and 54 and thus are secured inside the backlight chassis 50.

The light guide plate 42 is formed of a highly transparent resin such as an acrylic resin or the like, and has a rectangular shape having approximately the same size as that of the liquid crystal panel 10. The light guide plate 42 is provided with lengthy substrates 44 along a top end portion 41 (in use) and a bottom end portion 43 (in use) thereof. A great number of white-type LEDs (light emitting diodes) 45 are provided in a line on each of the lengthy substrates 44. Thus, the backlight device 40 is configured to allow light from each of the LEDs 45 to be incident on the light guide plate 42.

The light guide plate 42 is provided with a reflective sheet 46 (see FIG. 5) bonded to a surface thereof facing the bottom plate 52 of the backlight chassis 50. Thus, light incident on light guide plate 42 from each LED 45 is reflected or refracted to be changed in the direction and diffused, and then is output toward the liquid crystal panel 10.

The plastic chassis 30 formed of a resin has a frame shape having an opening having a shape and a size corresponding to those of a light output surface (surface from which the light is output) of the light guide plate 42. The plastic chassis 30 is provided between the light guide plate 42 and the optical sheet 20 to secure the positional relationship therebetween, and also blocks light direct from each LED 45 against an output surface of the optical sheet 20 and a display surface of the liquid crystal panel 10.

The optical sheet 20 is a resin sheet that diffuses and uniformizes the light output from the light guide plate 42 and outputs the diffused light toward the liquid crystal panel 10.

Figure 2:
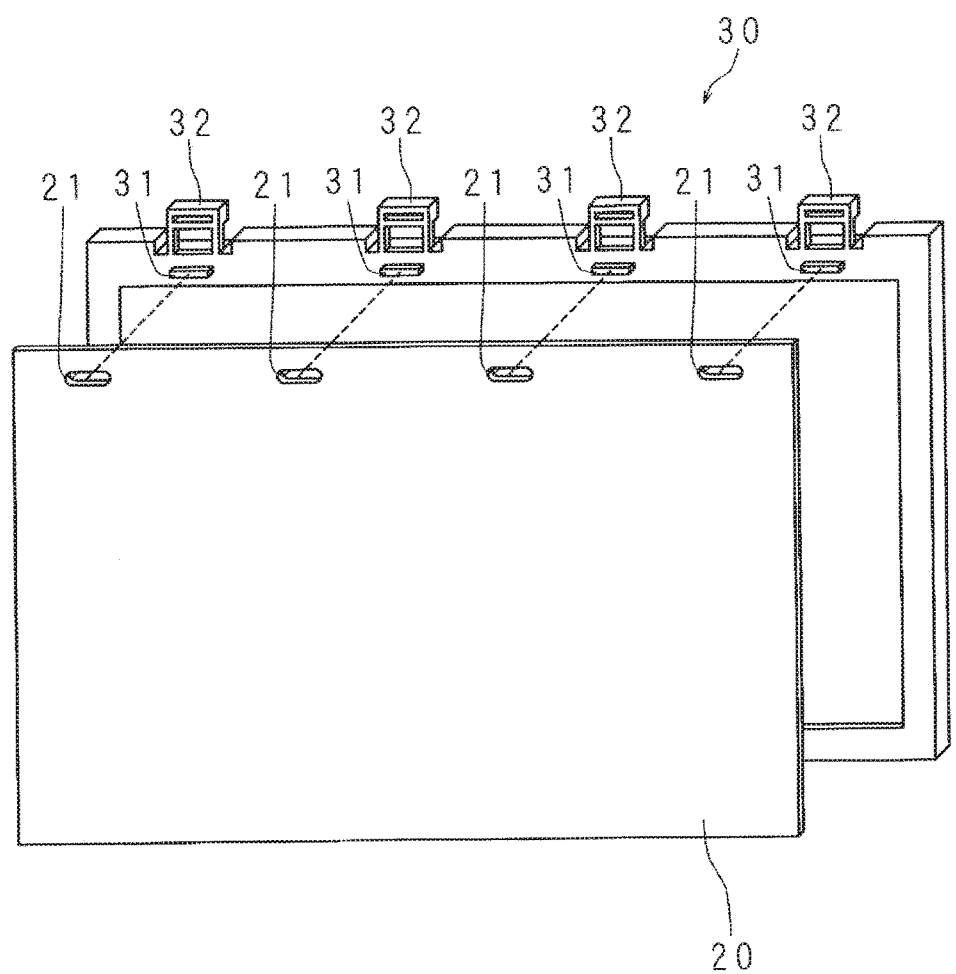
FIG. 2 shows a mechanism by which an optical sheet is secured to a plastic chassis.

FIG. 2 shows a mechanism by which the optical sheet 20 is secured to the plastic chassis 30.

Four lengthy protrusions 31 are provided on a surface, facing the optical sheet 20, of a top frame portion (in use) of the plastic chassis 30, and four perforations 21 respectively allowing the protrusions 31 to be inserted therethrough are formed on a top portion (in use) of the optical sheet 20.

Figure 3:
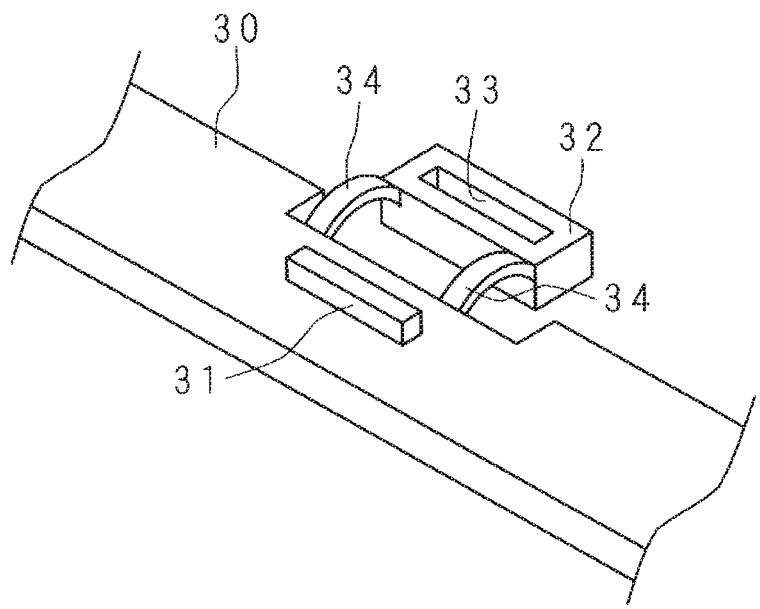
FIG. 3 is an enlarged isometric view of a pressing portion.

As shown in FIG. 3, a pressing portion 32 is provided in the vicinity of each of the protrusions 31. The pressing portion 32 includes a hole 33, into which the protrusion 31 is fit, and presses the optical sheet 20 to the plastic chassis 30, more specifically, to an area around the protrusion 31.

The pressing portion 32 is integrally formed with the top frame portion (in use) of the plastic chassis 30, and is coupled with the top frame portion of the plastic chassis 30 via a hinge 34 formed to be thinner than the plastic chassis 30.

Figure 4:
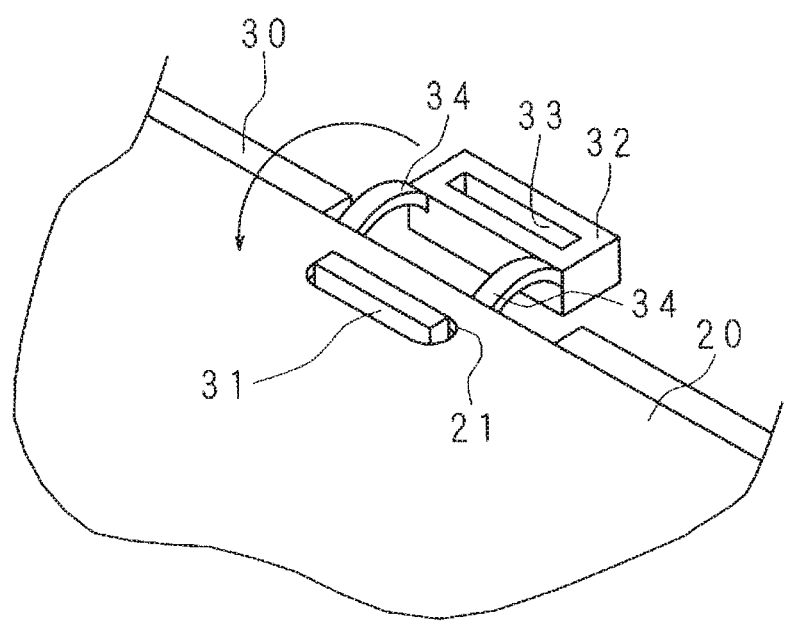
FIG. 4 shows a function of the pressing portion.

As shown in FIG. 4, in a state where each protrusion 31 is inserted through the corresponding perforation 21 in the optical sheet 20, the hinge 34 is bent, so that the protrusion 31 is fit into the corresponding hole 33. In this manner, the pressing portion 32 presses the optical sheet 20 to the plastic chassis 30, more specifically, to an area around the protrusion 31, and thus secures the optical sheet 20 to the plastic chassis 30. The protrusions 31 fit into the holes 33 may be bonded with the pressing portion 32 with an adhesive, or the protrusions 31 may be fit into the holes 33 so as not to easily come off, in a state where the optical sheet 20 is pressed.

In a state of being pressed by the four pressing portions 32, the optical sheet 20 is hung downward and secured so as not to contact the light guide plate 42. With such a structure, the deformation of the light guide plate 42 is not transferred to the optical sheet 20, and therefore, the optical sheet 20 is not sagged or wrinkled. The radiant heat of the LEDs 45 is not transferred to the optical sheet 20 via the light guide plate 42, and therefore, an end portion of the optical sheet 20 (in the vicinity of the LEDs 45) is not wrinkled.

Figure 5:
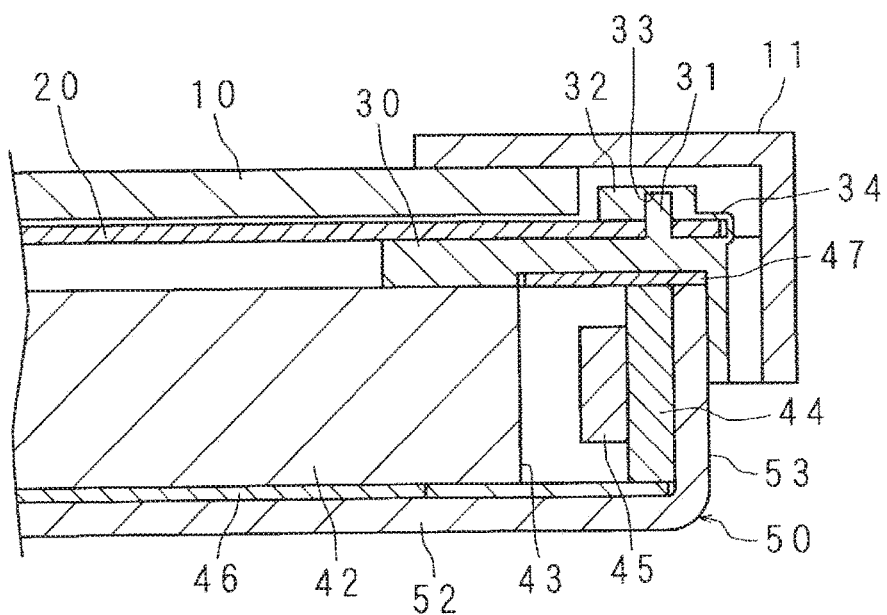
FIG. 5 is a cross-sectional view of the pressing portion and the vicinity thereof showing an assembly state of the liquid crystal display apparatus according to an embodiment of the present invention.

FIG. 5 is a cross-sectional view of the pressing portion 32 and the vicinity thereof showing an assembly state of the liquid crystal display apparatus according to an embodiment or the present invention.

In the backlight device 40, the plastic chassis 30, which has a frame shape, is fit into the opening of the backlight chassis 50 in a state where the light guide plate 42 is accommodated in the backlight chassis 50, and the plastic chassis 30 presses and secures the light guide plate 42. A reflective sheet 47 is bonded to a surface of the plastic chassis 30 that faces the LEDs 45. The reflective sheet 47 reflects light, leaking sideways from the LEDs 45, toward the light guide plate 42.

The optical sheet 20 is pressed by the pressing portion 32 to be secured to the plastic chassis 30 and is held between the plastic chassis 30 and the liquid crystal panel 10.

The bezel (frame) 11, in a state of covering and holding the liquid crystal panel 10, is engaged with the plastic chassis 30, so that the liquid crystal panel 10 and the backlight device 40 are held together. The liquid crystal display apparatus is structured in this manner.

Figure 6:
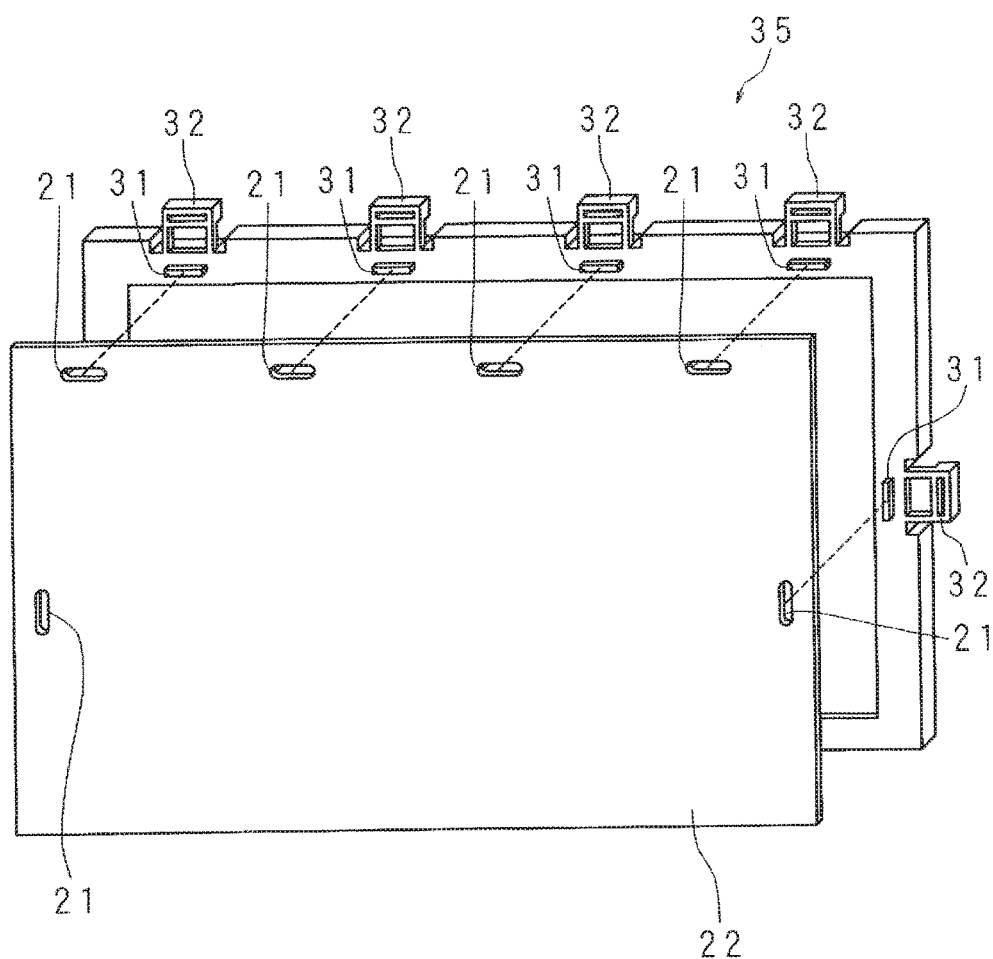
FIG. 6 shows another mechanism by which an optical sheet is secured to a plastic chassis.

In this embodiment, the protrusions 31 and the pressing portions 32 are provided on the top frame portion of the plastic chassis 30, and the perforations 21 are provided in the top portion of the optical sheet 20. As shown in FIG. 6, a plastic chassis 35 may include a further protrusion 31 and a further pressing portion 32 provided on each of two sides thereof, and an optical sheet 22 may include a further perforation 21 provided on each of two sides thereof. In this case, the optical sheet is secured more strongly. Alternatively, the protrusions 31 and the pressing portions 32 may be provided along the entire circumference of the plastic chassis, and the perforations 21 may be provided along the entire circumference of the optical sheet 22.

Figure 7:
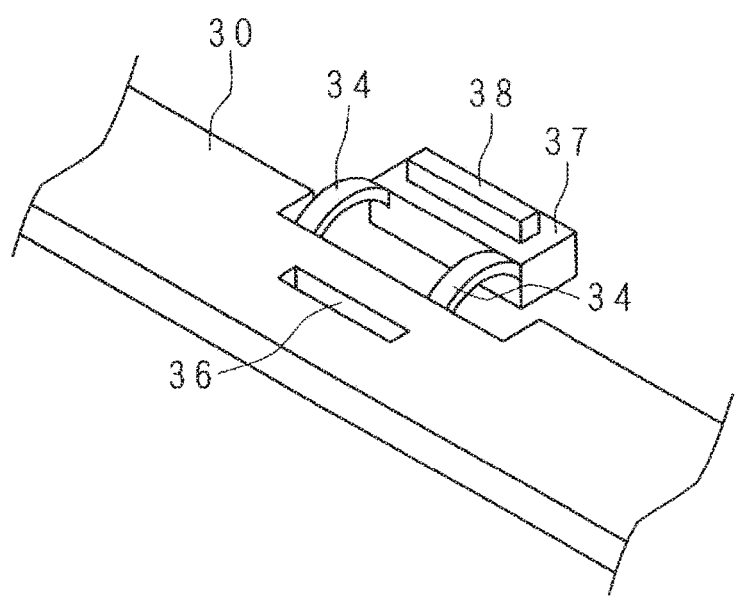
FIG. 7 is an enlarged isometric view of another pressing portion.

In this embodiment, the protrusions 31 are provided on the top frame portion of the plastic chassis 30, and the holes 33 are provided in the pressing portions 32. Oppositely, as shown in FIG. 7, the plastic chassis 30 may include holes 36 formed in the top frame portion thereof, and pressing portions 37 may each be provided with a protrusion 38 located thereon. With such a structure, substantially the same effect is provided.

The above-described embodiments should be construed as being illustrative in all the aspects and as non-limiting. The scope of the present invention is defined by the claims, not by the above-described description. The present invention is intended to encompass the significance equivalent to the claims and also encompass all the possible alterations and modifications in the scope of the claims.

The present invention is applicable to a liquid crystal display apparatus usable for a TV receiver, a computer display or the like and to a backlight device included in such a liquid crystal display apparatus.

What is claimed is:

1. A backlight device, comprising:
a light guide plate allowing light which is emitted from a light source and incident on an end surface thereof to be output from a light output surface thereof;
an optical sheet diffusing the light from the light output surface and outputting defused light;
a frame member formed of a resin and having an opening corresponding to the light output surface, the frame member being provided between the light guide plate and the optical sheet to secure a positional relationship therebetween and blocking light from the light source against an output surface of the optical sheet; and
a plurality of securing members provided at, and integrally formed with, a peripheral edge of the frame member, the plurality of securing members securing the optical sheet;
wherein:
the plurality of securing members are each coupled with the frame member via a hinge formed to be thinner than the frame member;
the plurality of securing members each include a pressing portion having a hole, the pressing portion pressing the optical sheet to the frame member;
the frame member is provided with protrusions respectively fit into the holes;
the optical sheet includes perforations respectively allowing the protrusions to be inserted therethrough; and
the protrusions are inserted through the perforations and fit into the holes, and the pressing portions press the optical sheet to the frame member.

2. A liquid crystal display apparatus, comprising:
the backlight device according to claim 1; and
a liquid crystal panel having a rear surface to receive light emitted by the backlight device.

3. A backlight device, comprising:
a light guide plate allowing light which is emitted from a light source and incident on an end surface thereof to be output from a light output surface thereof;
an optical sheet diffusing the light from the light output surface and outputting diffused light;
a frame member formed of a resin and having an opening corresponding to the light output surface, the frame member being provided between the light guide plate and the optical sheet to secure a positional relationship therebetween and blocking light form the light source against an output surface of the optical sheet; and
a plurality of securing members provided at, and integrally formed with, a peripheral edge of the frame member, the plurality of securing members securing the optical sheet;
wherein:
the plurality of securing members are each coupled with the frame member via a hinge formed to be thinner than the frame member;
the plurality of securing members each include a pressing portion provided with a protrusion, the pressing portion pressing the optical sheet to the frame member;
the frame member includes holes into which the protrusions are respectively fit;
the optical sheet includes perforations respectively allowing the protrusions to be inserted therethrough; and
the protrusions are inserted through the perforations and fit into the holes, and the pressing portions press the optical sheet to the frame member.

4. A liquid crystal display apparatus, comprising:
the backlight device according to claim 3; and
a liquid crystal panel having a rear surface to receive light emitted by the backlight device.

* * * * *